Feb. 1, 1966  J. GAYDECKI  3,232,597
DAMPERS
Filed Sept. 11, 1963
8 Sheets-Sheet 1

INVENTOR
JAN GAYDECKI
BY
ATTORNEY

Feb. 1, 1966  J. GAYDECKI  3,232,597
DAMPERS
Filed Sept. 11, 1963  8 Sheets-Sheet 3

INVENTOR
JAN GAYDECKI
BY
ATTORNEY

INVENTOR
JAN GAYDECKI
BY
ATTORNEY

INVENTOR
JAN GAYDECKI
BY
ATTORNEY

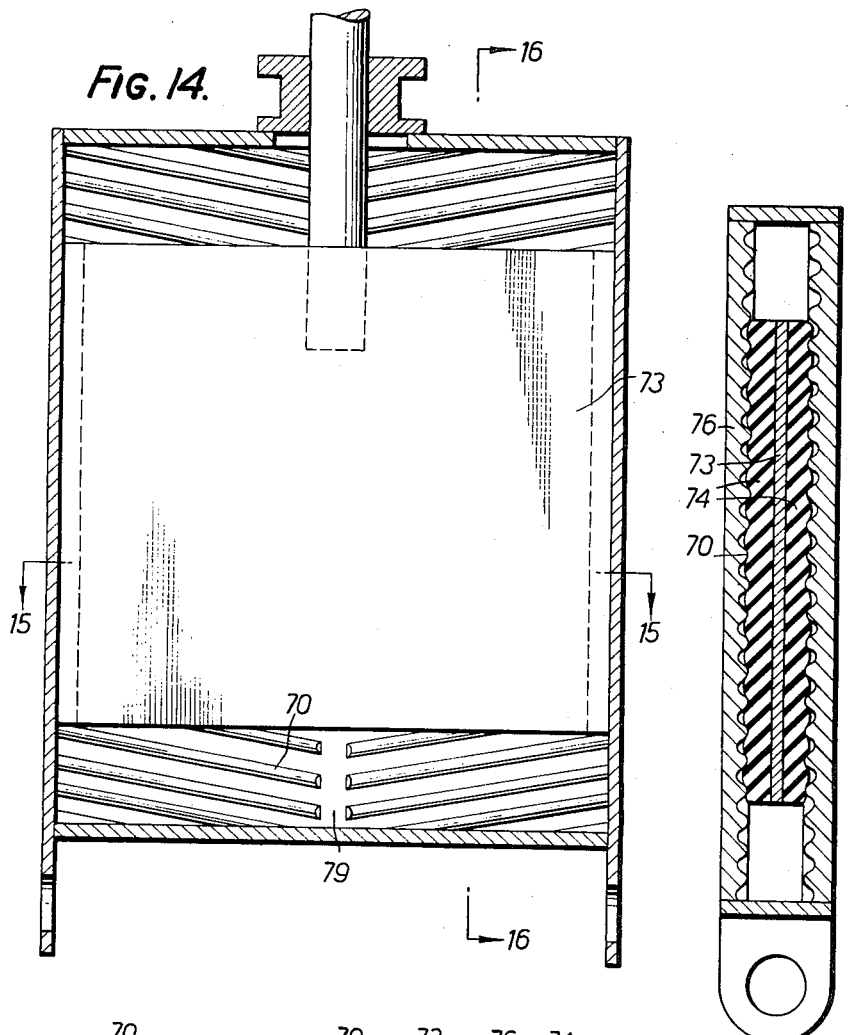

Feb. 1, 1966 J. GAYDECKI 3,232,597
DAMPERS

Filed Sept. 11, 1963 8 Sheets-Sheet 7

INVENTOR
JAN GAYDECKI
BY John M. ____
ATTORNEY

Feb. 1, 1966 J. GAYDECKI 3,232,597
DAMPERS
Filed Sept. 11, 1963 8 Sheets-Sheet 8

INVENTOR
JAN GAYDECKI
BY
ATTORNEY

United States Patent Office 3,232,597
Patented Feb. 1, 1966

3,232,597
DAMPERS
Jan Gaydecki, Leicester, England, assignor to Metalaslik Limited, Leicester, England, a British company
Filed Sept. 11, 1963, Ser. No. 308,274
Claims priority, application Great Britain, Sept. 13, 1962, 35,032/62
19 Claims. (Cl. 267—8)

This invention relates to dampers and has as an object to provide a damper in which energy is dissipated in the form of heat, the conversion to heat energy being achieved due to internal hysteresis of rubber or the like material. It is well known that due to the internal hysteresis of rubber and the like material significant damping is quite often achieved when using rubber mountings, suspensions, couplings and so on. More specifically, the object of the present invention is to utilize this phenomena in an advantageous way to produce a damper per se.

According to the present invention there is provided a damper comprising two relatively movable parts, one of rigid, substantially non-deformable material and the other of rubber or rubber-like material supported on a rigid backing, said parts being urged into pressure contact with one another and being slidable one over the other in operation of the damper, the rigid material part having at least one formation in engagement with and locally deforming the rubber or rubber-like material in operation of the damper, the arrangement being such that the locality of said deformation continually changes during the relative sliding movement of said relatively movable parts, and the energy dissipated by sliding friction is kept small compared with the dissipation of energy due to the hysteresis of the rubber or rubber-like material.

With a damper as just defined, the or each formation on the rigid material part, as it slides across the rubber or rubber-like material part, continuously compresses and releases the rubber or rubber-like material and causes a ripple to move across its surface. Due to the internal hysteresis loss, the restoring force is smaller than the force required to deflect the rubber or rubber-like material, and hence damping of the relative movement between the sliding parts is obtained and thus the damping effect for the damper.

In addition to the damping due to hysteresis, there will also be some damping due to surface friction between the sliding parts. This must however be kept small compared with the hysteresis damping because, unlike hysteresis damping, the damping force achieved due to sliding friction remains constant with frequency so as to be inefficient for large amplitudes of relative movement whilst giving rise to a hard damper for small amplitudes. In the case of hysteresis damping using rubber or rubber-like material however the damping force increases with frequency in the same way as with a hydraulic damper. Since friction damping is independent of frequency whereas the hysteresis damping depends upon this variable, the ratio of hysteresis damping to friction damping achieved in a damper according to the present invention is not constant. The damper will be satisfactory nevertheless provided that for practical applications the hysteresis damping materially exceeds the friction damping.

To reduce the friction damping as far as possible, the rigid material and/or the rubber or rubber-like material may be self-lubricating materials or the relatively sliding surfaces may be lubricated.

Using lubricated surfaces, the ratio of hysteresis damping to friction damping can be maintained in the region of 4:1 for practical applications. This must be regarded as a limiting ratio however and lower ratios of say 2:1 may be acceptable in certain circumstances.

Preferably, the or each formation on the rigid material part is constituted by a ridge extending perpendicular or substantially perpendicular to the direction of relative sliding movement between the rigid material part and the rubber or rubber-like material.

Thus, in the preferred constructions of damper according to the invention, the rigid material part has a ribbed or corrugated face which slides in pressure contact with a smooth face on the rubber or rubber-like material part, the ribs or corrugations being spaced by less than the normal working travel of the damper whereby the work of the damper is normally distributed substantially throughout the rubber or rubber-like material.

Preferably also, the ribs or corrugations are permanently in contact with the rubber or rubber-like material face throughout the working travel of the damper.

The ribbed or corrugated face may be formed by a helical ridge or a plurality of circumferential ridges on an outside surface of the rigid material part, the rubber or rubber-like material being in the form of a sleeve surrounding the rigid material part and being held in pressure contact with the ribbed or corrugated face by an outer, rigid backing sleeve.

Alternatively, the ribbed or corrugated face may be formed by a helical ridge or a plurality of circumferential ridges on an inside surface of the rigid material part, the rigid material part being in the form of a sleeve surrounding the rubber or rubber-like material part which itself is in the form of a sleeve on an inner, backing part, the rubber sleeve being a force fit within the rigid material part so as to be held in pressure contact therewith.

Again, the ribbed or corrugated face may be formed by a plurality of ridges on a flat surface of the rigid material part, in which case the rubber or rubber-like material has a flat face held in pressure contact with the ridges by holding means forming part of the damper.

The ridge or ridges may be of symmetrical or of non-symmetrical cross-sectional shape. Where the ridges are non-symmetrical, the damping force will be greater for relative movement in one direction than it is for relative movement in the other direction. This will hereinafter be explained in greater detail.

The rigid material part and the rubber or rubber-like material part may be reciprocable or rotatable with respect to one another in operation of the damper to create said relative sliding movement between the rigid material part and the rubber or rubber-like material part. Again, these parts may be universally movable with respect to one another to create the relative sliding movement upon relative movement of the parts in at least two directions at right angles, one of the parts, in this case, being an inner ball-like part surrounded by the other part.

Specific embodiments of the present invention will now be described, merely by way of example, with reference to the accompanying drawings in which.

Figures 1, 2:
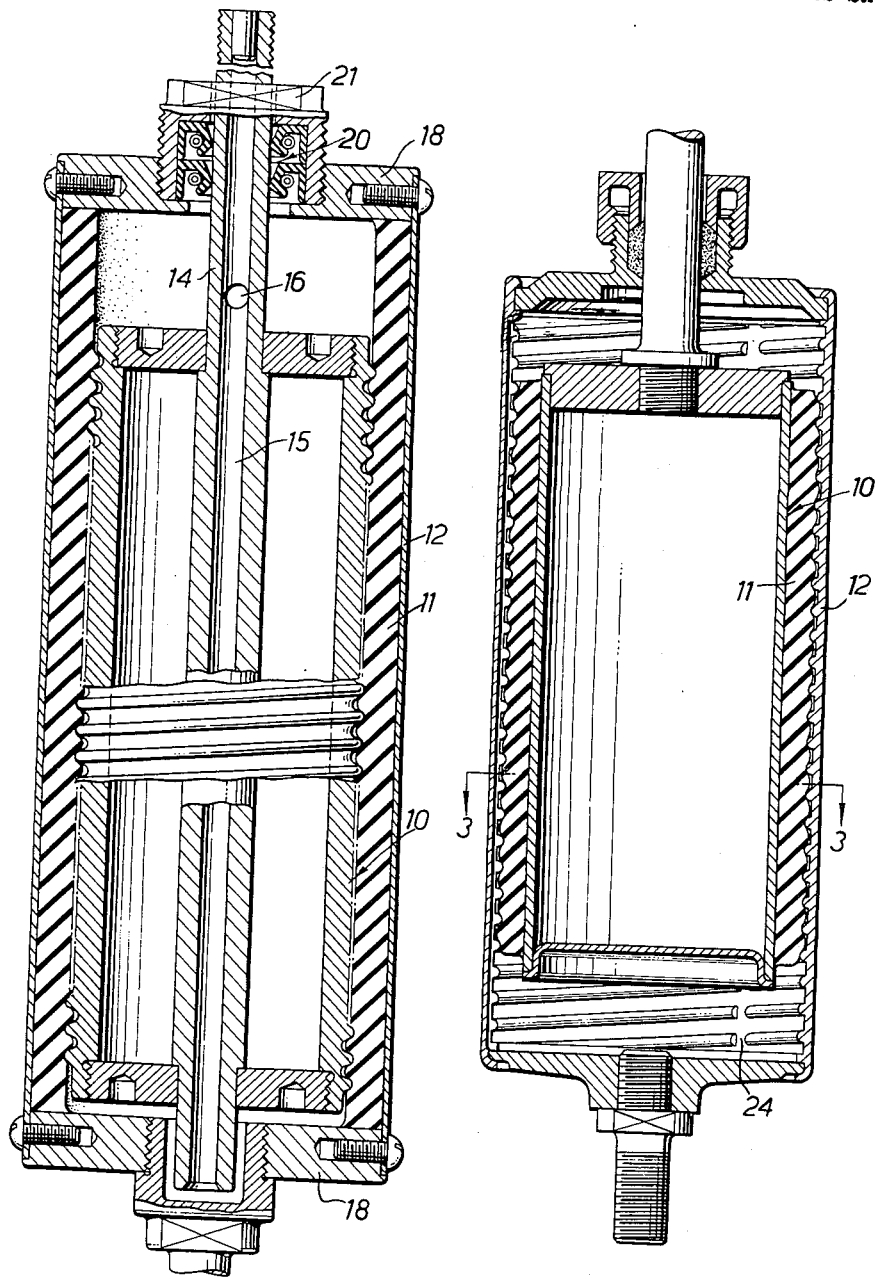
FIGS. 1 and 2 are cross-sectional elevations of different dampers in accordance with the present invention.
Figure 3:
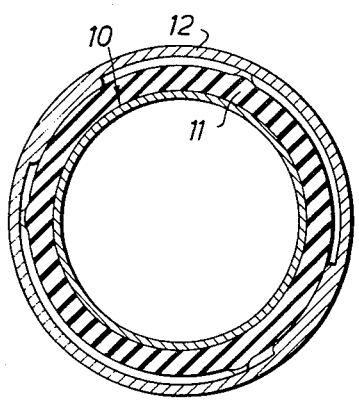
FIG. 3 is a cross-section on line 3 in FIG. 2.
Figure 6:
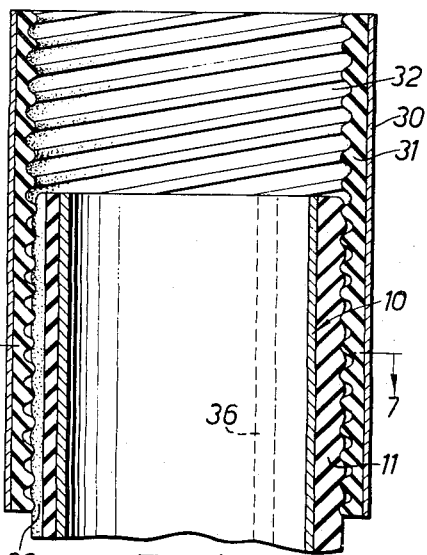
Figure 5:
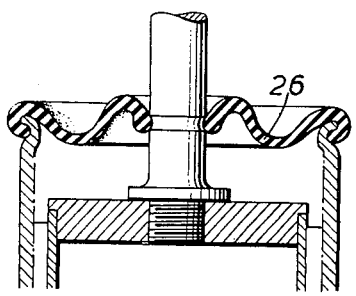
Figure 7:
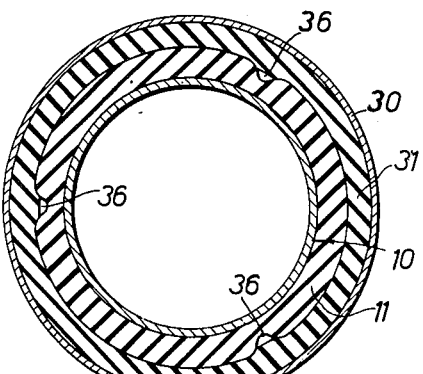
Figure 8:
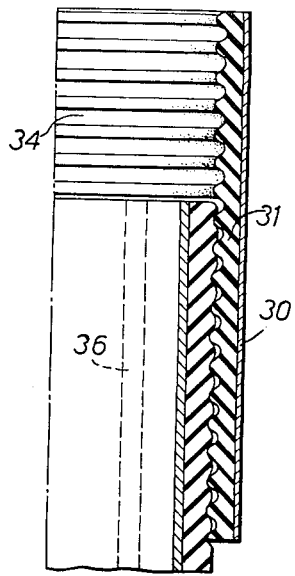
Figure 9:
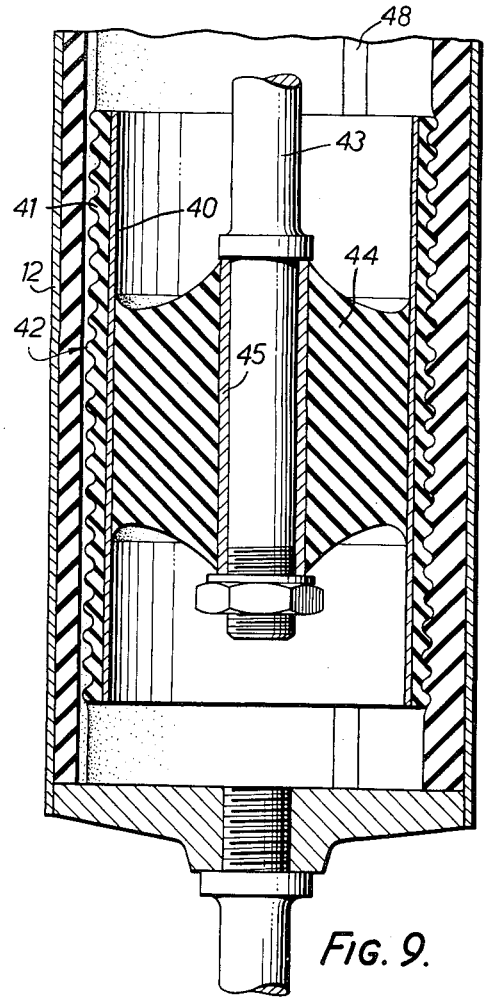
Figures 10, 11:
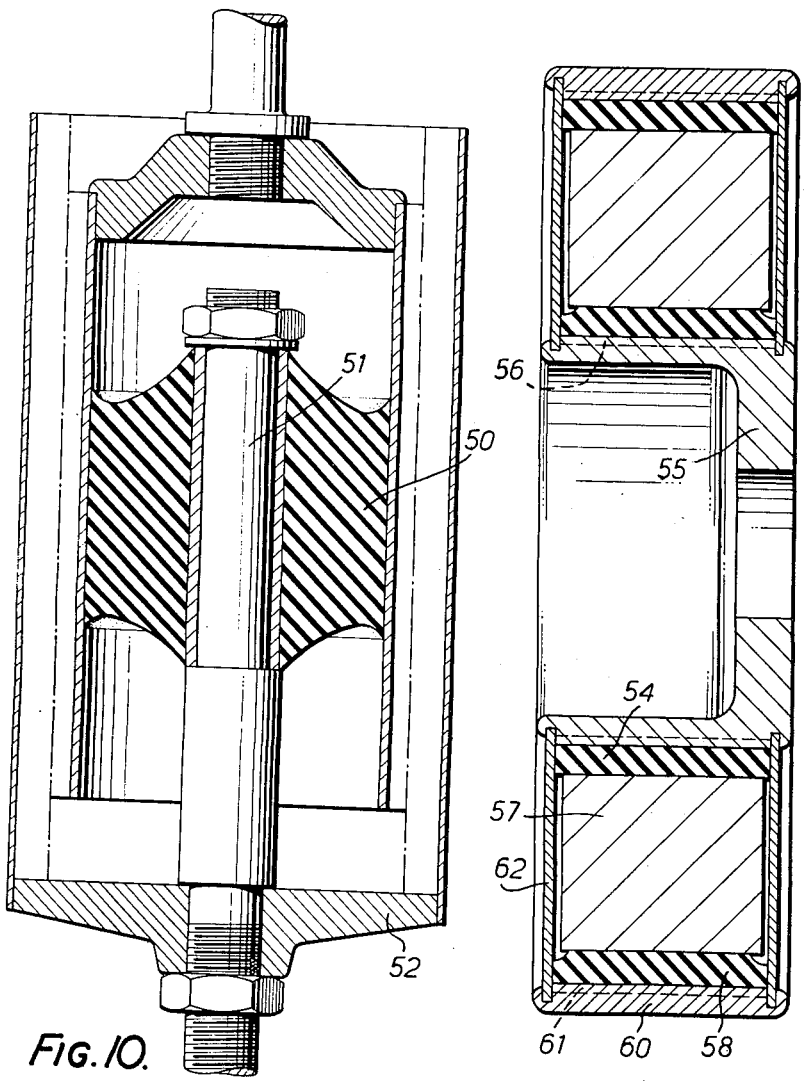
Figures 12, 13:
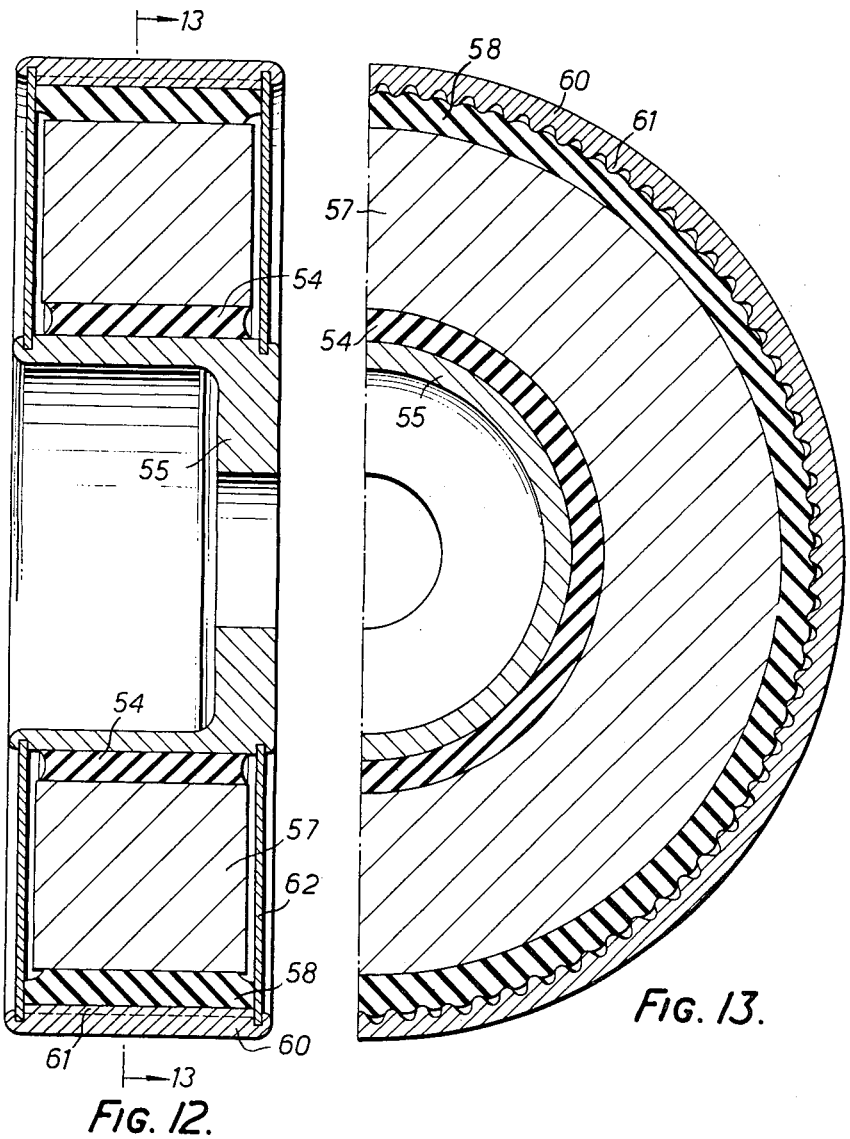
Figure 23:
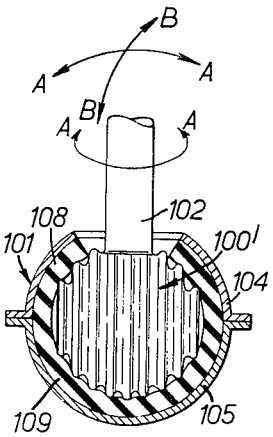
Figure 24:
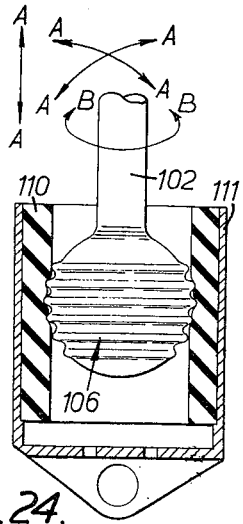
Figure 25:
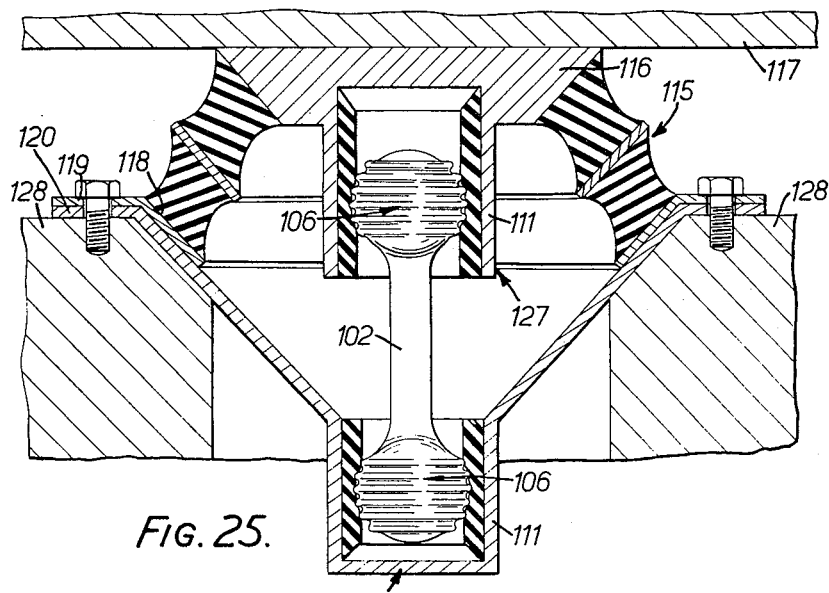
Figure 26:
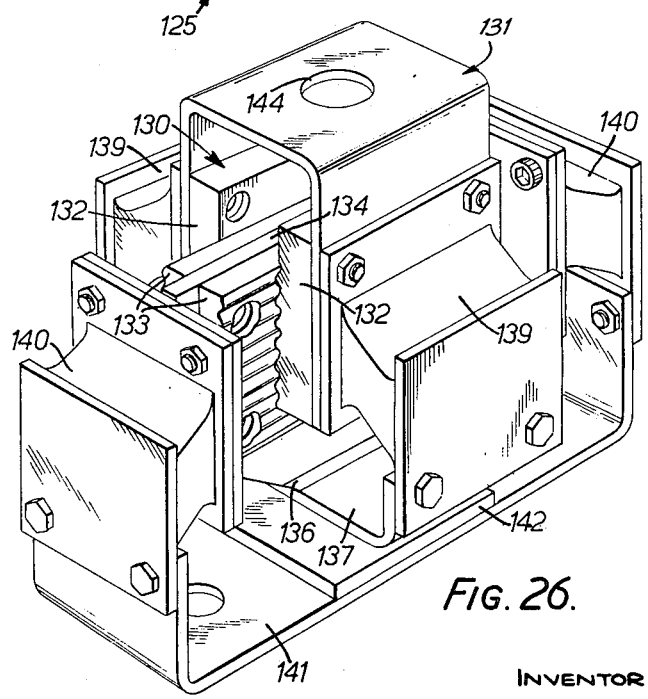

FIG. 5 is a partial elevational cross-section showing a further modification of the damper of FIGS. 2 and 3, FIG. 6 is a partial elevational cross-section of a still further damper according to the present invention, FIG. 7 is a cross-section on line 7—7 in FIG. 6, FIG. 8 is a partial elevational cross-section corresponding to FIG. 6 but showing a modification, FIG. 9 is a cross-sectional elevation of a still further damper according to the present invention incorporated in a unit in combination with a rubber suspension spring in series with a damper, FIG. 10 is a cross-sectional elevation of a still further damper according to the present invention incorporated in a unit in combination with a rubber suspension spring in parallel with a damper, FIGS. 11 and 12 are cross-sectional elevations respectively of two further dampers according to the present invention, FIG. 13 is a half section on line 13—13 in FIG. 12, FIG. 14 is a cross-sectional elevation of a still further damper according to the present invention, FIGS. 15 and 16 are cross-sections on lines 15—15 and 16—16 respectively in FIG. 14, FIGS. 17, 18 and 19 show details of construction which may be embodied in any of the dampers according to the invention described by way of example in this specification, FIGS. 20, 21, 22, 23 and 24 are all cross-sectional elevations of still further dampers according to the present invention, FIG. 25 is a cross-sectional elevation of a unit incorporating two dampers according to the present invention in combination with a rubber suspension spring in parallel with the dampers, and FIG. 26 is a perspective view of a unit incorporating a damper according to the present invention in combination with rubber suspension springs in series and in parallel with the damper.

Referring to FIG. 1, the damper there shown comprises two relatively movable parts in the form of a piston and a cylinder respectively. In this example, the piston 10 is of a rigid, substantially non-deformable material, e.g., metal, and has an outer, cylindrical ribbed or corrugated surface having a single helical ridge of small helix angle thereon. The cylinder is constituted by a cylindrical rubber sleeve 11 bonded within an outer cylindrical metal casing 12 which supports and backs the rubber sleeve.

The piston 10 is a force fit in the rubber lined cylinder so that the ribbed or corrugated surface of the piston is urged under load into pressure contact with the internal surface of the rubber sleeve, the ribs or corrugations lying permanently in contact with the internal rubber surface during operation of the damper and being loaded thereagainst by a constant lead throughout the working stroke of the damper due to the force fit of the piston in the 11 is a smooth cylindrical surface, as indicated at the top cylinder.

In its free state, the internal surface of the rubber sleeve of the sleeve in FIG. 1. The helical rib on the piston locally deforms the rubber sleeve where the rib engages the sleeve, in effect to form a helical bulge on the internal surface of the sleeve.

The piston 10 is reciprocable in the cylinder formed by the rubber sleeve, and as it moves to and fro the locality of the helical bulge continually changes during the relative sliding movement, the bulge moving to and fro with the piston so that, in effect, a helical wave or ripple is caused to travel up and down along the internal surface of the rubber sleeve. The continuous deformation and release of the rubber of the sleeve in this way causes a hysteresis loss in the rubber, accompanied by the generation of heat, and the movement of the piston in the cylinder is consequently damped.

Due to its small helix angle, the ridge extends substantially perpendicular to its direction of movement to and fro along the rubber surface. The adjacent turns of the ridge are spaced by about one-quarter the full stroke of the piston, whereby for normal working travels of the damper the work of the damper is distributed substantially throughout the rubber and all the rubber between adjacent turns of the ridge is made to work.

The piston has a piston rod 14 which is drilled out as at 15 and provided with a port 16 so as to communicate one end of the cylinder with the other through the bore of the rod. The outer metal casing 12 carries end plates 18 which close off the cylinder space, the upper end plate in the present example carrying a suitable seal sealing the bearing 21 for the piston rod, and the cylinder is filled with oil to lubricate the sliding surfaces. Movement of the piston in the cylinder transfers the oil from one end of the cylinder to the other, in part at least through the bore 15, and oil will also flow along the helical groove to lubricate the internal surface of the rubber sleeve.

The heat generated in the rubber sleeve may be dissipated at least in part through the outer metal casing 12. In addition, the oil may be circulated through a cooler in order to dissipate some of the heat if desired.

The construction shown in FIG. 2 corresponds substantially with that described with reference to FIG. 1 except that the rubber sleeve 11 is carried on the outside of the piston so as to be supported and backed thereby and the outer metal cylinder 12 is ribbed or corrugated on its internal cylindrical surface. The sleeve 11 has an outside diameter dimensioned to be a tight fit in the cylinder so that the ribs or corrugations deform the outer surface of the rubber sleeve in the manner previously described. In FIG. 2 the helical rib is interrupted so as to form lengthwise running grooves 24 along which the oil in the cylinder can pass from one end of the cylinder to the other as the piston is reciprocated.

Figure 4:
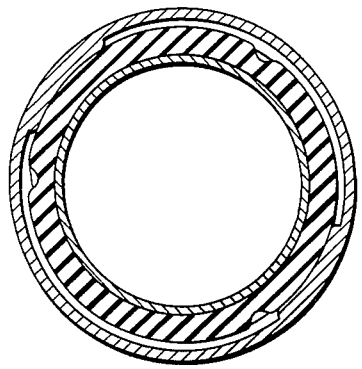
FIG. 4 is a cross-section corresponding to FIG. 3 but showing a modification.

Instead of having interruptions in the helical rib, the rubber sleeve may have longitudinal grooves, as shown in FIG. 4, to allow the oil to pass from one end of the cylinder to the other.

Since the oil is not under any substantial pressure, the upper end closure of the cylinder shown in FIG. 2 may be replaced by a rubber diaphragm 26 generally as shown in FIG. 5.

Instead of having a corrugated metal part, the corrugated surface may be formed on a part composed of any other suitable rigid material, e.g. a synthetic plastics material. This is shown in FIG. 6, where the cylinder is composed of an outer metal casing 30 onto which has been moulded an internally corrugated, synthetic plastics liner 31. The corrugations may be formed by a helical ridge 32 as shown in FIG. 6, or by means of a plurality of separate, circumferential ridges 34 as shown in FIG. 8, the ridges 34 extending perpendicular to the direction of movement of the piston and being spaced apart by an amount about equal to their own width for example. In the embodiments of FIGS. 6 and 8, the end closures to the piston and cylinder are not shown. These, however, may take any convenient form, for example as illustrated in FIG. 1 or FIG. 2. In FIG. 6, the rubber sleeve 11 on the outside of the piston 10 has longitudinal grooves 36 to allow the passage of the oil from one end of the cylinder to the other as the piston is reciprocated. This also applies to the embodiment shown in FIG. 8.

In FIG. 9, the piston comprises an inner metal sleeve 40 bearing a coating 41 or rigid, synthetic plastics material, having an outer ribbed surface 42, the piston rod 43 being connected to the piston through a suspension spring 44 in the form of a rubber bush bonded on its inner and outer peripheries to a sleeve 45 clamped on the piston rod 43 and the inner metal sleeve 40 respectively. In this construction the rubber material of the damper is again in the form of a sleeve 11 surrounding the piston and constituting a liner to the cylinder, which again has an outer metal casing 12 as in the FIG. 1 construction. The rubber sleeve 11 is grooved as at 48 to form passages for the transfer of the oil from one end of the cylinder to the other as the piston is reciprocated.

The damper, in the unit just described, acts as a shock absorber and slips to absorb shock loads applied to the suspension spring 44, the spring 44 otherwise acting as an anti-vibration mounting for example.

The construction illustrated in FIG. 10 may have its piston and cylinder constructed as just described, or as described with reference to FIG. 6 or FIG. 8. In the FIG. 10 construction, a suspension spring 50 in the form of a rubber bush is incorporated within the piston but bonded to an inner sleeve clamped on a rod 51 joined with the cylinder end closure 52 so as to be in parallel arrangement with the damper instead of in series with the damper as in FIG. 9. In this case, the damper acts to damp out oscillations of the suspension spring when it is subjected to transient or resonant virbrations.

FIG. 11 illustrates a torsional vibration damper according to the present invention. The damper comprises an inner hub member 55 having an outer ribbed surface 56, the ribs on which extend axially of the hub member. The rubber ring 54 is held radially compressed between the ribbed surface 56 and an inertia ring 57 to which the rubber ring is bonded around its outer periphery. The inertia ring is concentric with and surrounds the hub member 55. A further rubber ring 58 surrounds the inertia ring and is bonded to the outer surface of the inertia ring. The further rubber ring 58 is held radially compressed between the inertia ring 57 and an outer casing ring 60 having an internal ribbed surface 61, the ribs on which extend axially of the damper. Cover plates 62 are included to hold the inertia ring 57 and the rubber rings 54 and 58 axially in place between the hub member 55 and the outer casing ring.

In operation of the damper just described, torsional vibrations are damped by rotational movement of the inertia ring relative to the inner hub member and outer casing ring, causing the ribs to slide across, and thereby continually change the locality of the deformations imposed upon the rubber rings. The relative sliding surfaces may be lubricated or a self-lubricating material may be used to compose one or both the relatively sliding parts.

FIGS. 12 and 13 show a further torsional vibration damper according to the present invention, in which the inner rubber ring 54 is bonded both to the inertia ring 57 and the hub member 55, so as to form, in combination, a tuned damper and a hysteresis damper.

The construction of damper shown in FIGS. 14, 15 and 16 corresponds substantially with that described and shown with reference to FIG. 2 except that in the present case the damper is of a flattened form and bands of separate, inclined ribs 70 are provided on the outer casing or cylinder. A flat rectangular piston comprises a flat plate 73 having bonded to each side of the plate a rubber slab 74, the rubber slabs in turn being held in pressure contact with ribbed plates 76 by holding means in the form of side walls making up with the plates a flat rectangular cylinder. Gaps between the edges of the rubber slabs and longitudinal breaks 79 in the ribs provide the passages for the transfer of oil from one end of the cylinder to the other during reciprocation of the piston.

Figure 17:
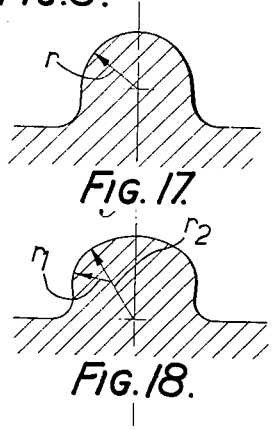
Figure 18:
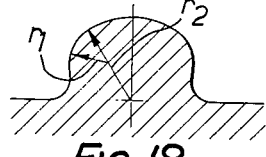
Figure 19:
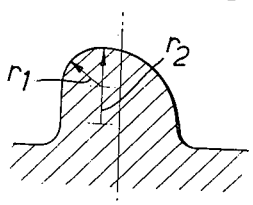

In any of the embodiments of the invention which have so far been described, the ridges may be of part circular cross-section as shown in FIG. 17 or of part elliptical cross-section as shown in FIG. 18. Again, any other symmetrical, smoothly curved cross-sectional shape may be used so as to give equal damping in either direction of relative movement. If the damping force is required to be different depending on the direction of relative movement however, the ridges may be of smoothly curved non-symmetrical shape in cross-section for example part circular and part elliptical as shown in FIG. 19. In this case the damping force obtained due to relative movement of the ridge to the left in the figure is greater than relative movement of the ridge to the right in the figure because of the greater displacement of rubber or the like material when the ridge moves in the former direction.

In a similar way, variation in damping force for movement in one direction may be obtained by varying the cross-sectional dimension of the ridges or the overall cross-sectional dimension of the rigid material part whereby the pressure contact between the rubber or rubber-like material part varies with relative displacement of the parts.

Figure 20:
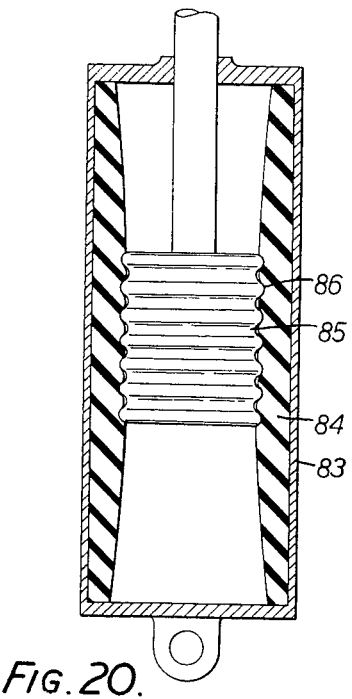

Again, variation in damping force for movements away from a mean position may be achieved by varying the thickness of the rubber section e.g, the section of the rubber lining sleeve in a piston and cylinder construction in which the ribs or ridges are formed on the piston. This is illustrated in FIG. 20 for example where the cylinder 83 has a rubber sleeve liner 84 the thickness of which increases from the ends towards the centre of the lengthwise extent of the sleeve. The piston 85 is cylindrical and has a series of circumferential ridges 86. The piston is a force fit in the central part of the sleeve 84. Due to the shape of the rubber section, the damping force decreases with displacement of the piston in either direction from its mean position in the central part of the sleeve 84, because the pressure contact between the relatively sliding parts decreases. In the construction now being described, the leading ridge or ridges 86 may lose contact with the internal surface of the rubber sleeve when the piston is moved to either end of its stroke. This causes a further variation in the damping force.

Figure 21:
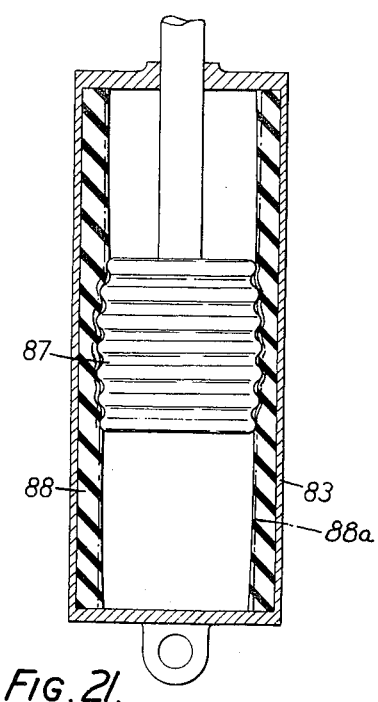

FIG. 21 illustrates an embodiment in which the damping force increases with displacement of the piston in either direction from its mean position. The ribbed piston 87 is, in this case, barrel shaped so as to vary in overall cross-sectional dimensions and the rubber sleeve liner 88 has a thickness which increases from the centre towards the ends of the sleeve.

The damping force provided by a damper according to the present invention is dependent inter alia on the viscous stiffness of the rubber material which is deformed, and the central sections of the rubber sleeves in FIGS. 20 and 21 for example may be composed respectively of rubber of higher and lower viscous stiffness than that of the rubber composing the rest of the sleeves thereby to obtain a further variation of damping force with displacement of the piston from its mean position in the cylinder.

Figure 22:
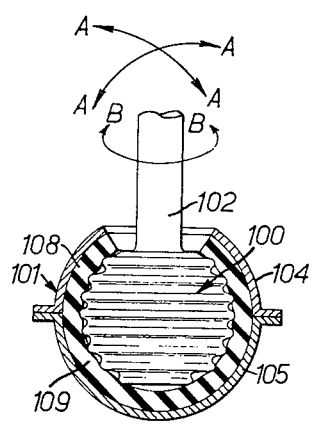

The dampers shown in FIGS. 22 and 23 employ an inner ball-like part 100 or 100′ which is spheroidal and which is relatively movable in an outer, spherical housing 101. In these examples the inner part 100 or 100′ is of a rigid, substantially non-deformable material, e.g. metal and has an outer ribbed or corrugated surface formed by a series of ridges arranged in parallel planes. The inner part is formed in each case as a ball-end on a shank indicated at 102 and the ridges are disposed in planes normal to the shank axis in FIG. 22 and parallel with the shank axis in FIG. 23.

The outer housing 101 is, in each case, composed of two part spherical cup-like portions 104, 105 the latter having a central aperture for the emergence of the shank 102. The cup-like portions have outwardly directed circumferential flanges 106, 107 uniting them together by bolting, rivetting or welding or by one of the flanges being swaged or spun or otherwise locked over the other. The cup-like portions are lined with correspondingly part spherical liners 108, 109 of rubber which are held in pressure contact with the inner ball-like part by the cup-like portions, the rubber being in radial precompression between the inner ball and the cup-like portions. The rubber liners may be bonded to the cup-like portions.

The dampers as just described give damping mainly due to hysteresis and some surface friction for relative movement of the shank 102 in the directions A—A and a small amount of damping, due to friction only, in the directions B—B.

In FIG. 24 the inner ball-like part 106 is of barrel form with its major axis disposed along that of the shank 102. Circumferential ridges are provided on the part 106 in planes normal to the shank axis and some of these ridges deform a cylindrical rubber lining 110 to an outer cylindrical housing 111 when the shank axis is aligned with the cylindrical axis, the rubber lining 110 being held in pressure contact with the ridges by the outer housing 111. The lining 110 is bonded to the outer housing.

With the damper shown in FIG. 24, damping due to hysteresis and friction is obtained for relative movements in the directions A—A and a small amount of damping due to friction only in the direction B—B.

The dampers shown in FIGS. 22 and 23 are suitable for use as pendulum dampers or suspension dampers. They can be used also for centrifugal separator drives as a combined coupling and damper to damp oscillations when passing through the critical speed. The damper shown in FIG. 23 may also be used as a shaft coupling for shafts subject to angular misalignment in a case where an overload safety slip is required.

The damper described with reference to FIG. 24 gives damping for relative movements at random. It is particularly useful for damping relative linear movement between parts subject to large angular misalignment.

A particular application of this is illustrated in FIG. 25 which shows an anti-vibration mounting which provides flexibility and damping under vertical, horizontal and tilting movement. The mounting comprises an interleaved, frusto-conical rubber suspension spring 115 having a central metal part 116 vertically supporting a piece of machinery 117 or the like. The outer annular metal end plate 118 of the spring has a horizontal outwardly directed annular flange 119 to which is attached a corresponding flange 120 at the larger diameter end of an inverted metal frusto-cone which supports the cylindrical housing 111 of a damper 125 having the construction described with reference to FIG. 24. The shank 102 of the inner ball-like part 106 of the damper is connected or formed in one piece with the shank 102 of the inner ball-like part 106 of a further damper 127 also constructed as described with reference to FIG. 24. The cylindrical housing 111 of the damper 127 is carried by the part 116 so as to align axially with the corresponding housing of the other damper in the unloaded condition of the device.

The mounting is supported on the machine foundation 128 at the flanges 119, 120, whereby the dampers 125 and 127 act in parallel with the spring 115 to damp out transient and resonant vibrations.

Either one of the dampers 125 or 127 in the unit just described with reference to FIG. 25 may be replaced by a damper having the construction shown in FIG. 22 or FIG. 23.

FIG. 26 shows the application of a flat damper according to the present invention in a combined anti-vibration and shock absorbing mounting. The damper is contained at the centre of the mounting and is generally indicated at 130. The damper comprises a U-shaped member 131, the limbs of which hold rubber pads 132 in pressure contact with ribbed metal plates 133 bolted one on each side of a carrier plate 134. The ribs on the metal plates 133 are horizontally disposed so as to lie perpendicular to their intended direction of movement relative to the rubber pads.

The carrier plate 134 is welded at its lower edge, as at 136, to a channel member 137 carried from the bracket 131 beneath the bracket by a pair of rubber shear springs 139. A further pair of rubber shear springs 140 support the carrier plate 134 from a channel member 141. The member 141 carries a buffer pad 142 beneath the channel member 137. The part to be mounted is carried on the top of the bracket 131 (for which purpose a bolt-hole 144 is provided) and the member 141 is bolted to the foundation or the like.

The damper is in parallel with the springs 139 which are brought into operation to stiffen the mounting when the member 137 strikes the buffer 142 or previously if the damper is caused to deflect. The springs 140 are in series with the damper and support the initial load of the mounting. If the mounting is subjected to a shock load sufficient to cause the rubber blocks 132 to slip downwardly across the ribbed plates 133, damping work is done by the damper, which, in this case, is acting as a shock absorber. At the same time the springs 139 are brought into operation and act to stiffen the mounting. Oscillations of the springs 139 are then damped by the damper.

The mounting of FIG. 26 is shown in its free position. Under its initial loading condition the rubber pads 132 are moved down so that all the ribs on the plates 133 are in contact with the rubber pads to deform the pads and the slipping load of the damper is then at its highest value.

The mounting as shown in FIG. 26 provides horizontal flexibility by shear deformation of the rubber springs. The mounting is also deflectable to tilt its vertical axis by deformation of the rubber springs.

A lubricant may be provided to lubricate the relative sliding surfaces of the damper in any of the constructions described. The lubricant may be a liquid lubricant or a solid lubricant. Lubrication of the surfaces in this way is not essential however and instead, self-lubricating materials or materials impregnated with lubricant may be used.

The rubber may have a thin surface layer 88a (see FIG. 21) in contact with the ribs or corrugations on the rigid material part, the surface layer being composed of rubber or rubber-like material, for example a self-lubricating material, which is favourable to the relative sliding movement of the parts with small dissipation of energy due to sliding friction, the rubber underlying the surface layer having high hysteresis damping characteristics so as to be favourable to provide a large dissipation of energy due to hysteresis. With such an arrangement the surface layer should be sufficiently thin for the underlying high damping material to be deformed by the ridges or corrugations during use of the damper.

In any of the constructions of damper hereinbefore described any suitable rubber-like material may be used instead of the rubber described, provided only that it has a useful internal hysteresis loss upon deformation.

I claim:

1. A damper comprising two relatively movable parts, one composed of a rigid substantially non-deformable material and the other comprising rubber material supported on a rigid backing, said parts being urged into pressure contact with one another and being slidable one over the other in operation of the damper, said one of said parts having a corrugated face of which the corrugations extend at a large angle to the direction of relative sliding movement between said parts, said corrugated face lying in engagement with and loading a smooth continuous face of the rubber material substantially wholly in compression under the action of the forces urging the parts into pressure contact, said rubber material having a much greater length than thickness in the direction of relative sliding movement between said parts each of said corrugated depressing said rubber material by a substantial amount compared with the thickness of the rubber material normal to said face, and said corrugations lying close together, said corrugated face thereby imposing a corrugated form on said smooth continuous face involving deformation of the whole of the face over the area of contact between it and said corrugated face, said parts being slidable relative to one another throughout the normal working travel of the damper continuously to shift the locality of each of the corrugations imposed upon said smooth continuous face of the rubber material along said face whereby the rubber material is continuously unloaded and loaded on said face substantially wholly in compression by said corrugated face and energy is dissipated due to the hysteresis of the rubber material.

2. A damper as claimed in claim 1 wherein the rubber material has a viscous stiffness which varies along said smooth continuous face.

3. A damper as claimed in claim 1, wherein the corrugations on said corrugated face are spaced apart by less than the normal working travel of the damper.

4. A damper as claimed in claim 1, wherein the corrugations on said corrugated face all lie permanently in contact with and load said smoothly continuous face of the rubber material.

5. A damper as claimed in claim 1, wherein said one of said parts is an inner part and the other of said parts comprises a sleeve of rubber material surrounding the inner part and urged into pressure contact with an outside face of the inner part by an outer rigid backing sleeve for the rubber sleeve forming part of said outer part, said outside face being said corrugated face.

6. A damper as claimed in claim 1, wherein said one of said parts is an outer part in the form of a sleeve, and said other of said parts is an inner part within said outer part, the inner part comprising a sleeve of rubber material urged into pressure contact with an inside face on the outer part by a central backing part within the rubber sleeve and forming part of the inner part, said inside face being said corrugated face.

7. A damper as claimed in claim 1, wherein said relatively movable parts are plate-like parts said other of which comprises a sheet of rubber material supported on a rigid backing, and means is provided urging said parts into pressure contact with one another to load the corrugated face on said one of said plate-like parts against the face of the sheet of rubber material remote from its backing.

8. A damper as claimed in claim 1, wherein the corrugations are symmetrical in cross-sectional shape.

9. A damper as claimed in claim 1, wherein the corrugations are non-symmetrical in cross-sectional shape.

10. A damper as claimed in claim 1, wherein the rigid material part and the rubber material part are universally movable with respect to one another in operation of the damper to create said relative sliding movement upon relative movement of the parts in at least two directions at right angles, one of said parts being an inner ball-like part surrounded by the other part.

11. A damper as claimed in claim 10, wherein said other part is in the form of a sleeve within which the ball-like part is movable universally and, in addition, reciprocable to create said relative sliding movement.

12. A damper as claimed in claim 1, wherein said relatively movable parts are relatively reciprocable to cause said sliding movement one over the other in operation of the damper.

13. A damper as claimed in claim 12, wherein said corrugated face is curved in the direction of relative reciprocable movement of said parts whereby the pressure contact between the parts varies according to the relative positioning of the parts during their relative reciprocable sliding movement in operation of the damper.

14. A damper as claimed in claim 12 wherein said smooth continuous face of the rubber material is curved in the direction of relative reciprocable movement of said parts whereby the pressure contact between the parts varies according to the relative positioning of the parts during their relative reciprocable sliding movement in operation of the damper.

15. A damper as claimed in claim 1, wherein said relatively movable parts are relatively rotatable to cause said sliding movement one over the other in operation of the damper.

16. A damper as claimed in claim 1 wherein said rubber material face is composed by a surface layer of rubber material favourable to the relative sliding of said parts with small dissipation of energy due to sliding friction, the rubber material underlying said surface layer being favourable to provide a large dissipatiton of energy due to hysteresis, the surface layer being sufficiently thin so that both said surface layer and said underlying rubber material are deformed by said formation on the rigid material part during relative displacement of the parts.

17. A damper as claimed in claim 1, wherein the corrugations on said corrugated face are all of equal size and form whereby said corrugated face imposes a uniform corrugated form on said smooth continuous face of the rubber material and said parts are slidable relative to one another throughout the normal working travel of the damper continuously to shift the locality of each of the corrugations imposed upon said smooth continuous face of the rubber material along said face each without variation of its size and shape whereby the rubber material is continuously and uniformly unloaded and loaded substantially wholly in compression by said corrugated face and energy is dissipated due to the hysteresis of the rubber material.

18. A damper as claimed in claim 1, further comprising means for maintaining lubricant between the relatively slidable surfaces of said parts whereby the energy dissipated by sliding friction in use of the damper is kept small compared with dissipation of energy due to the hysteresis of the rubber material.

19. A damper as claimed in claim 1, wherein one at least of the relatively slidable surfaces of said parts is self lubricating whereby the energy dissipated by sliding friction in use of the damper is kept small compared with the dissipation of energy due to the hysteresis of the rubber material.

References Cited by the Examiner

UNITED STATES PATENTS

| 2,308,966 | 1/1943 | Saurer | 267—9 X |
| 2,819,063 | 1/1958 | Neidhart | 267—63 |
| 2,827,281 | 3/1958 | Cooney | 267—9 |
| 3,053,526 | 9/1962 | Kendall | 267—1 |

FOREIGN PATENTS

| Ad. 70,249 | 11/1958 | France. |
| 1,110,107 | 10/1955 | France. |
| 803,454 | 4/1951 | Germany. |
| 484,529 | 9/1953 | Italy. |
| 573,922 | 3/1958 | Italy. |

ARTHUR L. LA POINT, *Primary Examiner.*

W. B. WILBER, *Assistant Examiner.*